United States Patent Office 3,215,583
Patented Nov. 2, 1965

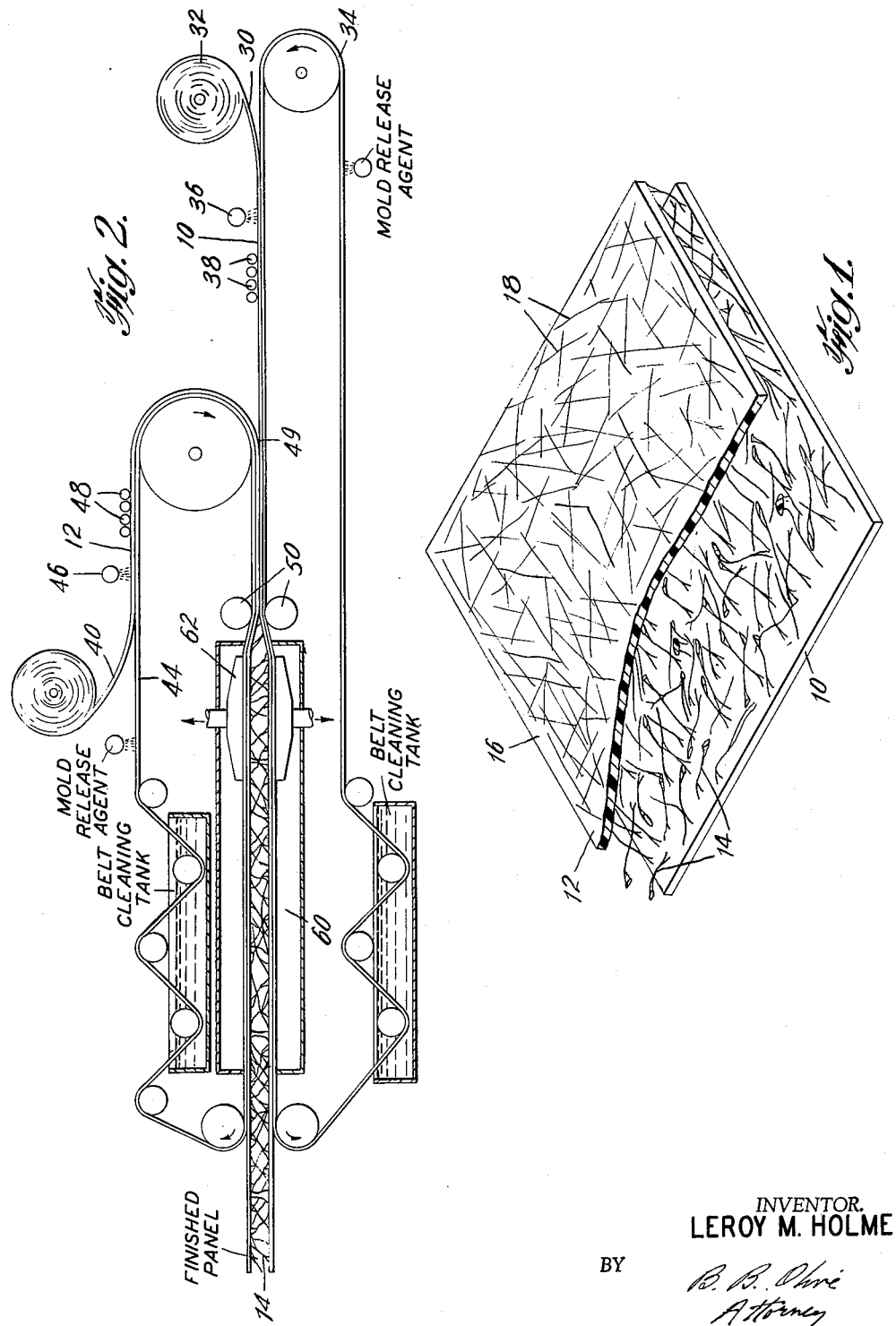

3,215,583
INTEGRAL STRUCTURE
Leroy M. Holme, Eugene, Oreg., assignor, by mesne assignments, to Capella Corporation, Eugene, Oreg., a corporation of Oregon
Filed July 15, 1963, Ser. No. 294,998
4 Claims. (Cl. 161—53)

This invention relates generally to plastic panels and, more particularly, to a unique integral structure which is useful in plastic panels.

Heretofore, various types of plastic sheets have been used for a variety of purposes, such as for walls of buildings, luminous ceiling panels, fences, decorative panelling, and the like. Although these sheets are generally used in non-load-bearing applications, many of the uses require sheets with a relatively high degree of stiffness so that rather large sections may be used without sagging or bending. Of course, the stiffness of any particular sheet material is directly related to its thickness. Thus, in the case of solid sheets, the greater the required stiffness, the greater must be the thickness of the sheet and, therefore, the greater the amount of plastic resin required. Accordingly, because of the relatively high cost of the plastic resins conventionally used in such sheets, the use of the solid sheets has been rather limited.

The economic disadvantages of the solid sheet materials have been overcome to some extent by the use of laminated or composite panels, which are generally made by bonding a cellular core material to a pair of rigid facing sheets. Although the laminated panels provide relatively stiff structures with rather small amounts of plastic material, they are much more difficult and costly to fabricate compared with the solid sheets. For example, the bonding of the core material to the facing sheets requires the use of adhesives or other bonding mechanisms which add to the cost of the final product.

It is, therefore, the main object of the present invention to provide an improved plastic panel.

It is another object of the invention to provide a unique integral structure which can be used to make improved plastic panels.

It is still another object of the invention to provide an improved plastic panel which provides good stiffness with a minimum of plastic material and yet does not require costly bonding operations.

It is a further object to provide such a panel which is light in weight and has good thermal and acoustical insulating properties.

A still further object is to provide such a panel which exhibits a unique decorative effect.

Still another object is to provide a process for producing such a panel.

A further object is to provide a process for producing such panels continuously.

Other aims and advantages of the invention will be apparent from the following description and appended claims.

In the drawings:

FIG. 1 is an isometric view of a preferred embodiment of the inventive panel with portions thereof broken away to show the internal structure of the panel; and FIG. 2 is a schematic elevation view of a preferred process for producing the panel of FIG. 1.

In accordance with the present invention, there is provided an integral structure comprising a plastic sheet having a multiplicity of integral extensions protruding outwardly from at least one surface thereof. In a preferred embodimenut of the invention, there is provided an integral panel comprising a pair of spaced-apart plastic sheets and a multiplicity of integral extensions of the plastic sheets forming a network throughout the space between the sheets, the network maintaining the sheets in a fixed spaced-apart relationship.

There is also provided a process for producing such an integral structure, which process comprises providing a plastic sheet and forming a multiplicity of integral extensions protruding outwardly from at least one surface of the sheet. In a preferred embodiment of the invention, there is provided a process for producing an integral panel, which process comprises forming a first plastic facing sheet; forming a second plastic facing sheet; contacting a surface of the first sheet with a surface of the second sheet while at least one of the surfaces is in a tacky condition; separating the sheets while the sheet surface is still in a tacky condition so as to pull a multiplicity of integral extensions from the plastic sheet, thereby forming a network of the integral extensions between the sheets; and then setting the plastic sheets and the network while maintaining the sheets in spaced-apart relationship.

As used herein, the term "integral extensions" of a plastic sheet refers to extensions of at least one of the main components of the plastic sheet, the extensions and the sheet forming a single unitary or integrated structure.

The integral panel structure of this invention not only provides a high degree of stiffness with a small amount of plastic resin, but also permits an entire panel to be made without any joints between the various portions of the panel. Thus, the panel can be produced simply and quickly without the costly operations of bonding together a plurality of facing sheets and core materials. Moreover, the integral panel is light in weight, has good acoustical and thermal insulating properties, and provides a unique decorative effect.

A preferred embodiment of the inventive panel structure and a process for producing the same will be described in more detail by referring to the drawings.

Referring first to FIG. 1, there is shown an integral panel comprising a pair of spaced-apart plastic facing sheets 10 and 12 and a continuous lattice or network 14 of integral extensions of the sheets 10 and 12 extending throughout the space between the sheets. The facing sheets 10 and 12 and the integral extensions thereof are made of a suitable thermoplastic or thermosettable resin 16 reinforced with a multiplicity of glass fibers 18 embedded therein. For example, the sheets 10 and 12 may be composed of fiberglass mats 18 impregnated with the plastic resin 16. The thickness of the facing sheets 10 and 12 may vary over a wide range, and the choice of an exact sheet thickness for any given panel depends mainly on the total thickness desired in the final panel, which in turn depends on the degree of stiffness required in the panel. In general, the thickness of each facing sheet 10 and 12 in the final panel is preferably between about 0.001 inch and about 0.125 inch.

A wide variety of plastic materials are suitable for use in the integral panel of this invention. Resins of the thermosetting type are preferred, but certain liquid thermoplastic resins which will polymerize with heat, such as methyl methacrylate, may also be employed. Also, various mixtures of thermosetting and thermoplastic resins may be used. For example, a thermosetting polyester resin may be modified with methyl methacrylate and styrene monomer. Alternatively, the panel may be made of a thermoplastic polymer, such as polyethylene. Suitable thermosetting resins are the phenolaldehyde type, urea-aldehyde type and various thermosetting resinous compositions such as, phenol formaldehyde-protein resins, phenol formaldehyde-polyvinyl formal resins, phenol formaldehyde-polyvinyl alcohol resins, phenol formaldehyde-glycerine resins, phenol formaldehyde-urea resins, phenol formaldehyde-melamine resins, phenol formaldehyde-diazine resins, phenol furfural resins, phenol furfural formaldehyde resins, triazine formaldehyde resins, benzene disulphonamideacrolein resins, melamine dicyandiamide resins, polyethylene maleate-ethyl methacrylate resins, polypropyl maleate-vinyl acetate resins, methyl methacrylate-glycol methacrylate resins, polyvinyl chloride-diallyl succinate resins, styrene-divinyl benzene resins, etc.

The facing sheets 10 and 12 in the panel of FIG. 1 are disposed substantially parallel to each other and are spaced apart to form a central cavity for the fibrous matrix or network 14. The fibers or strands which form the network 14 are comprised of random integral extensions of the glass fibers 18 and/or the plastic resin 16 of the sheets 10 and 12. In other words, some of the resin extensions form strands of pure resin, while other resin extensions form coatings or sheaths on the fiberglass extensions. Whatever the exact form of the extensions, however, it is important that the fibrous network 14 be integral with the facing sheets 10 and 12. Some of the extensions are integral with both facing sheets, while other extensions are integral with only one of the facing sheets.

The thickness of the network 14, i.e., the spacing between the sheets 10 and 12, may vary over a wide range, depending on the degree of stiffness required. The upper limit on the thickness of the network depends somewhat on the thickness of the facing sheets 10 and 12, and the network thickness is preferably between about one and about fifty times the average original thickness of the sheets 10 and 12. For example, if the original thickness of each of the facing sheets 10 and 12 is about 0.01 inch, they should be spaced apart a distance of about 0.01 to 0.5 inch.

The proportion of glass fibers 18 in the integral panel is not critical, and typical panels contain about 20 to 30 weight percent glass fibers. It is preferred to use glass fibers as the reinforcing medium in the panel of FIG. 1, but there are many other fibers which may be employed, although they do not compare favorably with fiberglass from the standpoint of stability and tensile strength. For example, where cost is more of a consideration and lower strength may be required, other natural or synthetic fibers such as ramie, long fiber cotton, linen, jute, hemp, paper, sisal, cellulose, nylon and the like may readily be employed. Of course, a different fiber may be used in each facing sheet.

Although the panel of FIG. 1 contains a multiplicity of reinforcing fibers 18 in both the facing sheets 10 and 12 and the internal network 14, it will be apparent that the same type of integral panel may be made without the reinforcing fibers. In this case, both the facing sheets and the network of integral extensions would be pure resin. Similarly, one facing sheet could be provided with reinforcing fibers and the other sheet made of pure resin. In this case, that portion of the integral network adjacent the fiber-reinforced sheet would also contain fibers, while that portion of the network adjacent the pure resin sheet would be substantially pure resin. Of course, these panels would not be as strong as the uniformly reinforced panels, but they would still have a high degree of stiffness.

The integral structures of this invention may be used alone or in combination with other materials to form composite panels or structures. For example, the panel shown in FIG. 1 may be partially or wholly faced with fabric, wood, metal, glass, or any other suitable material. In other words, the plastic sheets 10 and 12 may be in the form of coatings on the inner surfaces of external facing material. The integral structures of the invention may also be used to form multilayer panels, either by forming a plurality of networks and sheets integral with each other or by bonding together a plurality of individual integral panels or structures. Of course, in any of these constructions, the fibrous extensions would always be integral with at least one adjacent sheet.

A preferred process for continuously producing the integral panel of FIG. 1 is shown in FIG. 2. In this process, a preformed fiberglass mat 30 of random, unoriented glass fibers is withdrawn from a supply roll 32 onto a lower horizontal belt conveyor 34. The belt conveyor 34 should have a smooth surface, such as stainless steel or polytetrafluoroethylene, and is preferably cleaned and sprayed with a mold release agent, as illustrated in the drawing, prior to the deposit of the fiberglass mat thereon. If desired, a disposable carrier film such as cellophane may be continuously fed between the mat 30 and the belt conveyor 34 to insure a smooth carrier surface. The carrier film may then remain on the finished panel as a permanent surface covering, or may be subsequently peeled off.

The belt conveyor 34 transfers the mat 30 under a resin impregnating means 36 which thoroughly impregnates the mat 30 with a suitable resin, thus forming a fiberglass-reinforced plastic sheet 10. Although the particular resin impregnating means shown in the drawing is a spray device, it will be understood that the resin impregnating step may be carried out in any other suitable manner, such as by passing the fiberglass mat through a bath of liquid resin.

While the fiberglass-reinforced plastic sheet 10 is being formed on the lower horizontal belt conveyor 34, a similar sheet 12 is prepared in the same manner on an upper horizontal belt conveyor 44 by impregnating a fiberglass mat 40 with a resin impregnating means 46. After the mats 30 and 40 have been impregnated, the resulting fiberglass-reinforced plastic sheets 10 and 12 are passed under compacting rolls 38 and 48, respectively, which slightly compress the sheets 10 and 12 to insure that the resin is thoroughly and uniformly distributed throughout the sheets. Although the mats 30 and 40 are illustrated as being impregnated with the resin before they are brought into contact with each other, it will be understood that both mats 30 and 40 may be impregnated with resin by a single resin application step after they have contacted.

From the compacting rolls 38 and 48, the compacted sheets 10 and 12 are brought into contact with each other, as at 49, and advanced through a pair of laminating rolls 50 which press the two sheets together under a slight pressure. This pressure should be sufficient to insure a firm contact between the two sheets, but not so great as to cause any substantial compression of the sheets. For example, where the total thickness of the two sheets is ¼ inch, the spacing between the laminating rolls 50 is suitably ³⁄₁₆ inch. Of course, the resin in the two sheets 10 and 12 must still be in a liquid or tacky condition when the sheets are contacted with each other.

As the laminated sheets 10 and 12 emerge from the rolls 50, they are advanced into an elongated horizontal curing oven 60. Mounted just inside the entrance to the oven 60 is a pair of upper and lower vacuum means 62 which separate the sheets 10 and 12 as the curing of the resin begins. The belt conveyors 34 and 44 are perforated so that the suction effects from the opposed vacuum means 62 draw the two sheets apart. Since the resin in the sheets 10 and 12 is only partly cured and in a tacky condition at this point, the separation of the two sheets causes each sheet to pull or draw a multiplicity of integral extensions of glass fibers and resin from the inner surface of the opposed sheet. The integral resin extensions are propagated both as coatings on the drawn glass fibers and as strands or fibers of pure resin. The result of this separating step is the formation of a random, unoriented lattice or network 14 of extensions which are integral with one or both of the two spaced-apart facing sheets 10 and 12. As shown in the drawing, this network 14 extends throughout the cavity between the two facing sheets.

Although the separating step is illustrated in the drawing as being achieved by the vacuum means 62, it will be understood that the separating step may be carried out by any other suitable method, such as by mechanical grippers which pull the sheets apart. Of course, after the sheets have been separated the desired distance, they must be held in the spaced-apart relationship until the resin in the network 14 has cured or set sufficiently to hold the sheets in fixed positions. For example, in the embodiment illustrated in FIG. 2, the sheets 10 and 12 are held in the spaced-apart relationship for the required period by the elongated heads on the vacuum means 62.

From the vacuum separating means 62, the integral panel is advanced on through the oven 60 to complete the curing of the resin. As is well known in the art, the curing conditions, such as the oven temperature and the oven dwell time, depend on a number of factors such as the particular resin employed, the size of the panel, and in some cases the use of catalysts or promoters which accelerate the cure or even cause the resin to set at room temperature.

As the finished panel emerges from the oven 60, it is allowed to cool to room temperature and sliced into individual panels ready for use. The integral panels of this invention are suitable for a variety of uses, such as in luminous ceilings, decorative panelling, and the like.

For some applications, it may be desirable to slice or sever the final panel along a plane parallel to the facing sheets 10 and 12 so as to form a pair of separate sheet structures, each of which has a multiplicity of integral extensions protruding outwardly from one surface thereof. These sheets may be used alone to provide unique decorative effects, or may be bonded to other materials to form various types of composite panels. For example, the protruding integral extensions of one of the sheet structures may be bonded to a facing sheet made of wood, metal, woven or non-woven fabric, glass, or any other suitable material. Alternatively, the same type of panel can be made by initially contacting one tacky plastic sheet with a non-tacky sheet, such as fabric, wood, cured plastic, or some other material which could be made to adhere to the tacky material. Then when the two sheets are separated, the fibrous network is drawn or pulled entirely from the tacky sheet and is simply bonded or joined to the other sheet. Of course, the fibrous network produced by this method is integral with only one of the facing sheets, i.e., the sheet from which it was propagated.

In a modified embodiment of the invention, two preformed plastic facing sheets are placed against the opposite surface of a fiberglass mat and then heated to a softened or tacky condition. The softened facing sheets are pressed against the fiberglass mat with sufficient pressure to integrate the plastic sheets with at least the surface portions of the fiberglass mat. The facing sheets are then separated slightly to form a network of integral fiberglass and resin extensions. In the case of relatively thin fiberglass mats, the entire mat may penetrate into the softened facing sheets, and the subsequent separating step expands the mat to from a fibrous network of fiberglass and resin extensions which are integral with the facing sheets. With thicker fiberglass mats, the separating step forms a separate network of integral extensions between each surface of the mat and the adjacent facing sheet, with a layer of fiberglass mat remaining in the center of the panel between the two networks. A woven fiberglass fabric may be used in place of the random fiberglass mat; in this case, the integral extensions formed by the separating step are composed mainly of plastic, since the glass fibers are woven together.

In an example of the invention, two flat facing sheets were prepared by placing two reinforcing fiber glass mats (Johns Manville Garanmat, 0.75 ounce per square foot) on sheets of cellophane and impregnating the mats with a thermosetting polyester resin. The resulting impregnated sheets contained about 25 weight percent glass fibers and 75 weight percent resin and were about 0.0312 inch thick. While the resin was still in a tacky condition (uncured), one of the sheets was inverted and positioned on top of the other sheet with the exposed sheet surfaces (not covered with cellophane) in contact with each other. The sheets were pressed together slightly to insure that they were in firm contact with each other. A vacuum was then applied to the cellophane-covered upper surface of the top sheet so that the suction raised the top sheet about 0.125 to 0.185 inch, thus separating the two sheets. As the sheets were separated, each sheet pulled or drew a multiplicity of integral fiber and resin extensions from the opposing surface of the other sheet. The resin extensions were propagated both as coatings or sheaths on the drawn fibers and as pure resin strands, thus forming a random fibrous lattice or network of integral resin and fiber extensions, the network extending continuously between the two sheets. The entire assembly was then cured at room temperature. The suction was continued until the resin had hardened sufficiently to hold the two sheets in a fixed spaced-apart relationship. The assembly was then removed from the oven and cooled to room temperature. The resulting panel was an attractive, stiff, light-weight structure having a total thickness of about 0.1875 to 0.250 inch. When the panel was placed in front of a light source, it produced a unique sparkling or variegated effect.

While various specific forms of the present invention have been illustrated and described herein in some detail, it will be apparent that the same are susceptible of numerous modifications within the scope of the invention. For example, although the invention has been described with particular reference to flat or planar panels, the invention is equally applicable to panels which are corrugated, curvilinear, or any other desired shape. The facing sheets may be at an angle to each other to form a panel of varying thickness. Also, although the formation of the fiberglass-reinforced facing sheets has been generally described as being carried out by resin impregnation of a preformed fiberglass mat, these sheets may be formed by any other suitable process, many of which are already known in the art. The process may also be carried out on either a batch or continuous biasis. Moreover, the facing sheets may be apertured or perforated rather than solid. Of course, many additives, such as pigments or colorants, may be added to the plastic materials used in the inventive structures.

What is claimed is:

1. A unitary panel construction comprising, in combination, a pair of generally parallel spaced apart plastic facing sheets each having a multiplicity of reinforcing fibers embedded therein, and fibrous extension means interconnecting said sheets defining a foraminous open core matrix therebetween, said fibrous extension means being formed of a random pattern of integral fiber and plastic extensions drawn out of said facing sheets, said extensions having their opposite extremities unitarily formed with respective different ones of said facing sheets and defining with said sheets a homogeneous jointless connection.

2. A process for producing an integral panel, which process comprises impregnating a first fiberglass mat with a plastic resin to form a first facing sheet in a tacky condition, impregnating a second fiberglass mat with a plastic resin to form a second facing sheet in a tacky condition, bringing the first and second facing sheets into contact with each other while the contacting sheet surfaces are in a tacky condition, drawing the first and second sheets apart so as to pull a multiplicity of integral fibrous extensions of said fiberglass and tacky resin from said sheets thereby forming an open network of said integral fibrous extensions between said sheets, and solidifying the plastic resin while maintaining the first and second sheets in spaced-apart relationship.

3. A process for producing an integral panel, which process comprises impregnating a first fiberglass mat with a thermosetting resin to form a first facing sheet, impregnating a second fiberglass mat with a thermosetting resin to form a second facing sheet, partially curing the resin in said facing sheets so that said resin is in a tacky condition, bringing the first and second sheets into contact with each other while said resin is still in a tacky condition and then drawing the two sheets apart so as to pull a multiplicity of integral fibrous extensions of said fiberglass and tacky resin from said sheets thereby forming an open network of said integral fibrous extensions between said sheets, and completing the curing of said resin while maintaining the first and second sheets in spaced-apart relationships.

4. A process for producing an integral panel, which process comprises impregnating a first fiberglass mat with a liquid plastic resin to form a first facing sheet in a tacky condition, impregnating a second fiberglass mat with a liquid plastic resin to form a second facing sheet in a tacky condition, bringing the first and second facing sheets into contact with each other while the contacting sheet surfaces are in a tacky condition, drawing the first and second sheets apart so as to pull a multiplicity of integral fibrous extensions of said fiberglass and tacky resin from said sheets thereby forming an open network of said integral fibrous extensions between said sheets, and solidifying the plastic resin while maintaining the first and second sheets in spaced-apart relationship.

References Cited by the Examiner
UNITED STATES PATENTS

| | | | |
|---|---|---|---|
| 2,494,848 | 1/50 | Whitelegg | 161—53 |
| 2,502,304 | 3/50 | Baker. | |
| 2,660,757 | 12/53 | Smith et al. | |
| 2,786,790 | 3/57 | Klein et al. | 161—53 |
| 2,962,409 | 11/60 | Ludlow et al. | 156—291 |
| 3,013,588 | 12/61 | Klingberg | 161—53 |

JACOB H. STEINBERG, *Primary Examiner.*

MORRIS SUSSMAN, ALEXANDER WYMAN,
*Examiners.*